United States Patent
Gross et al.

(10) Patent No.: US 6,928,346 B2
(45) Date of Patent: Aug. 9, 2005

(54) METHOD FOR MONITORING THE FUNCTIONING OF A CONTROL UNIT

(75) Inventors: Helmut Gross, Kornwestheim (DE); Uwe Daemmrich, Illingen (DE); Axel Aue, Korntal-Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 89 days.

(21) Appl. No.: 10/335,760

(22) Filed: Jan. 2, 2003

(65) Prior Publication Data

US 2003/0151490 A1 Aug. 14, 2003

(30) Foreign Application Priority Data

Jan. 5, 2002 (DE) .......................................... 102 00 242

(51) Int. Cl.$^7$ ............................................... G06F 11/00
(52) U.S. Cl. ............................... 701/33; 701/29; 700/5; 714/51
(58) Field of Search ............................. 701/33, 36, 29; 700/5, 1; 714/51, 43; 340/3.1

(56) References Cited

U.S. PATENT DOCUMENTS

| 6,044,014 A | * | 3/2000 | Komori et al. | ........ 365/185.04 |
|---|---|---|---|---|
| 2002/0040261 A1 | * | 4/2002 | Nakamoto et al. | ............. 701/1 |

FOREIGN PATENT DOCUMENTS

| DE | 41 14 999 | 11/1992 |
|---|---|---|
| DE | 195 45 645 | 6/1997 |
| DE | 196 53 551 | 2/1998 |
| DE | 197 12 445 | 10/1998 |
| DE | 199 44 939 | 8/2001 |
| DE | 100 63 449 | 7/2002 |

* cited by examiner

Primary Examiner—Thomas G. Black
Assistant Examiner—Christine M. Behncke
(74) Attorney, Agent, or Firm—Kenyon & Kenyon

(57) ABSTRACT

A method for monitoring the functioning of a control unit for the activation of output stages, for example, in a motor vehicle, is provided. The control unit includes a main computing element having at least one microprocessor, and at least one auxiliary computing element having at least one microprocessor. The main computing element and the at least one auxiliary computing element may access a common memory element. The present system enables monitoring of the control unit that is as simple as possible but is nonetheless secure and reliable, by providing that during normal operation of the control unit, the content of a specifiable memory location of the memory element be queried by at least one of the auxiliary computing elements at presettable times, given a functioning main computing element, the content having previously been written with a presettable value by the same.

16 Claims, 2 Drawing Sheets

METHOD FOR MONITORING THE FUNCTIONING OF A CONTROL UNIT

FIELD OF THE INVENTION

The present invention relates to a method for monitoring the functioning of a control unit for activating output stages, in particular in a motor vehicle. The control unit includes a main computing element having at least one microprocessor, and at least one auxiliary computing element having at least one microprocessor. The main computing element and the at least one auxiliary computing element may access a common memory element.

In addition, the invention relates to a computer program that may be executed on a computing element, in particular on a microprocessor, of a control unit to activate output stages, in particular in a motor vehicle.

Finally, the present invention also relates to a control unit for activating output stages, in particular in a motor vehicle. The control unit includes a main computing element having at least one microprocessor, and at least one auxiliary computing element having at least one microprocessor. The main computing element and the at least one auxiliary computing element communicate with one another via a common memory element.

BACKGROUND INFORMATION

In motor vehicles, control units are increasingly used for the control and/or regulation of particular functions of the motor vehicle. The motor vehicle functions that are to be controlled or regulated range from pure comfort functions (e.g., climate control, electric windows, electric sunroof actuation, etc.) to functions for operating the motor vehicle (e.g., functions of an internal combustion engine, of an exhaust gas purification system, of a transmission, etc.), to safety-related functions (e.g., functions of a brake system (anti-lock braking or ABS), dynamics of vehicular operation (electronic stability program, ESP), X-by-wire applications (electronic braking, electronic steering), etc.).

In control units for safety-related functions, it should be ensured that when there are malfunctions of the control program running on the control unit, no critical state of the motor vehicle function to be controlled via the output stage may occur. If program malfunctions are detected, the control unit should be switched over to limp-home operation, or should be switched off entirely. However, a precondition of this is the availability of a reliable function monitoring of the control unit.

Control units have a main computing element having at least one microprocessor. So that the control unit can fulfill its normal controlling and/or regulating function, a control program is run on the microprocessor. The control program is stored on a memory element of the main computing element. For the execution of the control program, this program is transferred either in segments or as a whole to the microprocessor, and is run there. In addition, many control units have at least one auxiliary computing device that includes, for example, a coprocessor. In contrast to the main computing element, which can be used universally, the auxiliary computing element is optimized for particular computations. The auxiliary computing element supports the main computing element in the running of the control program by executing, for example, particular computations (e.g., numeric or mathematical computations of a mathematical coprocessor) that occur in the context of the running of the control program.

Published German Patent Document No. 41 14 999 describes a control unit that has, in addition to the main computing element, a separate monitoring device that checks whether the main computing element is operating in error-free fashion. If a malfunction of the main computing element is detected, a reset of the overall control unit is triggered, or one or more output stages affected by the malfunction are locked. The malfunction of the control unit is detected in that from time to time data that must correspond to a particular pattern are exchanged between the main computing element and the monitoring device.

In published German Patent Document No. 100 63 449, a method is described for monitoring the functioning of a control unit, in particular for monitoring the consistency of interrupts. The control unit includes a main computing element that is formed as a CPU, and an auxiliary computing element in the form of a coprocessor. The auxiliary computing unit evaluates impulses that are produced by a hardware device (e.g., by an incremental angle encoder system), and generates, on the basis of the impulses, the interrupts for the main computing element. This latter device calculates a sampling time on the basis of the interrupts. In order to monitor consistency, the auxiliary computing element calculates a segment time, and transfers it together with the interrupt to the main computing element, which compares the received segment time with the calculated sampling time.

SUMMARY OF THE INVENTION

The present invention enables monitoring of the functioning of a control unit in a manner that is as simple as possible but is nonetheless secure and reliable.

In order to achieve this, the present invention provides that during the normal operation of the control unit, the content of a specifiable memory location of the memory element be queried at presettable (i.e., preselected) times by at least one of the auxiliary computing elements, given a functioning main computing element, the content having been written previously with a presettable value by the same.

The present invention provides that at least one of the auxiliary computing elements of a control unit be used at least in part for monitoring the functioning of the main computing element.

Control units may be ones in which a main computing element and at least one auxiliary computing element are configured on a common semiconductor device. Control units of this sort are also called single-chip systems. The main computing element includes the computing core, also called the central processing unit (CPU). The auxiliary computing element operates separately from the main computing element, and executes additional functions or calculations, and/or supports the main computing element. The auxiliary computing element includes what is known as a coprocessor.

The auxiliary computing element operates independently of the main computing element, and is coupled with the main computing element only via a memory element, a system clock, and a power supply. The auxiliary computing element has its own timing device, called a timer, for measuring time intervals of the system clock. With the aid of the timer, a value in a specifiable memory location of the memory element may be queried at presettable times, for example periodically. This querying of the memory location by the auxiliary computing element may be realized using hardware (for example using a specific coprocessor designed for this purpose), but also using software (for example, using a computer program provided for this purpose that runs on a conventional coprocessor).

The main computing element writes to the memory location at preset times with an activation value. The auxiliary computing element likewise reads in the content of the memory location at preset times, and checks the value that has been read in. After the content of the memory location is read in, this location may be written by the auxiliary computing element with a neutral value as an example. The times for the writing of the memory location with the activation value and for the reading in of the content of the memory location are adjusted to one another so that the memory location is always written before the reading in of the content. The writing of the memory location by the main computing element must take place within a shorter time duration than the timer value set down in the auxiliary computing element. Thus, if the main computing element does not write the specifiable memory location with the activation value at the correct time before the reading in of the content, or if the main computing element writes the memory location with a value deviating from the activation value, then either the neutral value or the wrong value (in any case, a value differing from the activation value) will be read in by the auxiliary computing element.

The auxiliary computing element thereupon diagnoses a malfunction of the main computing element or of the control unit as a whole, and introduces suitable countermeasures if necessary. The countermeasures may include a complete switching off of the control unit, of the main computing unit, or of the activated output stage, or else a switching over of the control unit to limp-home operation. A resetting of the control unit or of the main computing unit, or of the output stage, may be carried out as an example.

Another exemplary embodiment of the present invention provides that the memory location of the memory element be written with a neutral value by the auxiliary computing element after the content of the memory location is read in. The neutral value remains stored in the memory location until the memory location is written with the activation value by the (functioning) main computing element. The auxiliary computing element has an arrangement that is suitable for the writing of the memory location with the neutral value.

One specific embodiment of the present invention proposes that the content of the memory location of the memory element be queried periodically by the at least one of the auxiliary computing elements.

A presettable signal may be output by the auxiliary computing element if the content of the memory location of the memory element, queried by the at least one auxiliary computing element, is not the presettable value (i.e., the activation value). This signal may be used as an error signal, and may be forwarded to a device suitable for the execution of the countermeasures in the case of a malfunction of the main computing element or of the control unit.

A signal applied to at least one pin of the auxiliary computing element may be modified by the auxiliary computing element, and an external reset pin of the main computing element and/or a reset pin of an output stage activated by the control unit is charged with the signal. The signal applied at the pin is for example switched from "inactive" to "low" by the auxiliary computing element.

Finally, the present invention provides that the main computing element be evaluated as faulty if the at least one auxiliary computing element reads in a neutral value from the memory location of the memory element.

The method according to the present invention may be implemented in the form of a computer program that may be run on a computing element, in particular on a microprocessor, of a control unit for activating output stages, in particular in a motor vehicle. The computer program is suited for executing the method according to the present invention when it runs on the computing element. In this case, the invention is therefore realized by a computer program, so that this computer program represents the present invention in the same way as does the method for whose execution the computer program is suited. The computer program has two parts. A first part runs on the main computing element, and, given a functioning main computing element, effects the writing of the activation value to the memory location at the predetermined times. The second part runs on the at least one auxiliary computing element, and effects the reading in of the content of the memory location, likewise at predetermined times, and the checking of the content that is read in.

According to one exemplary embodiment of the present invention, the computer program is stored on a memory element. As a memory element, an electrical storage medium may be used, for example a flash memory. The computer program may optionally be stored on a separate program memory, or on the same memory element, to which both the main computing element and the auxiliary computing element have access, and in which the specified memory location is provided to which the main computing element writes the activation value, and whose content is queried by the auxiliary computing element. However, in the second case, the computer program is stored in a memory area of this memory element that is situated outside the memory location.

As another way to achieve the objective of the present invention, based on the control unit of the type cited above, it is provided that, during normal operation of the control unit, at least one of the auxiliary computing elements queries, at presettable times, the content of a specifiable memory location of the memory element, which, given a functioning main computing element, was previously written with a presettable value by the same.

According to one embodiment of the present invention, it is proposed that the memory element be formed as a dual-port random-access memory (DPRAM).

According to one embodiment of the invention, the main computing element and the at least one auxiliary computing element are configured on a shared semiconductor device (in what is known as a single-chip system). The memory element may also be situated on this semiconductor device.

The control unit may include an arrangement for executing the method according to the present invention. This arrangement may be constituted in part as hardware or else also as software.

DETAILED DESCRIPTION

Figure 1:
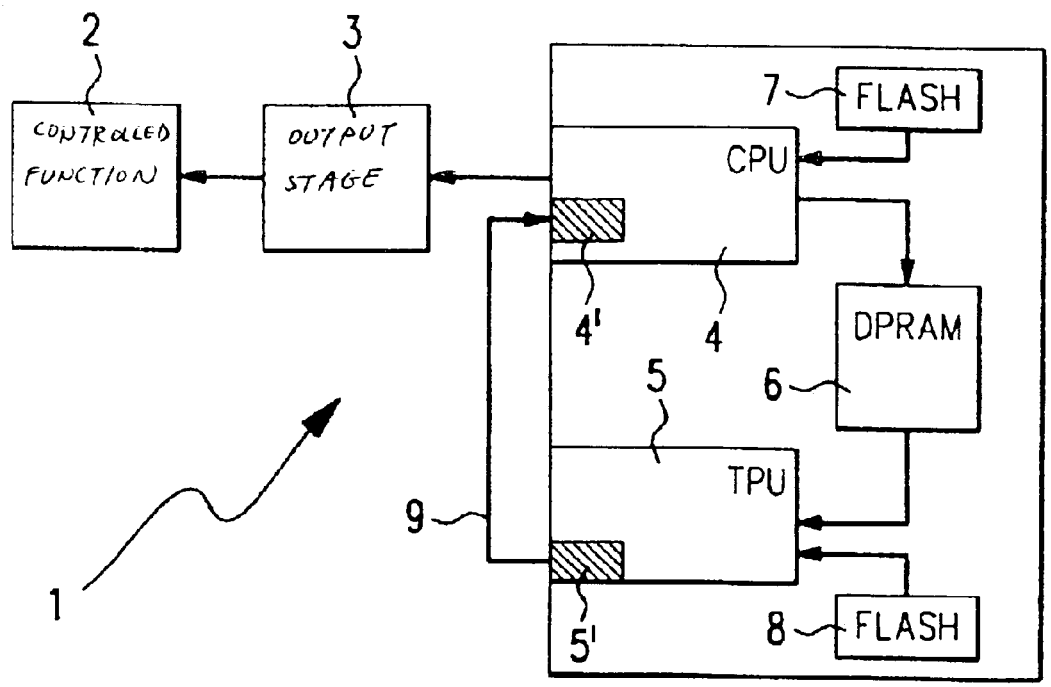
FIG. 1 is a schematic view of a control unit according to the present invention in a first embodiment.
Figure 2:
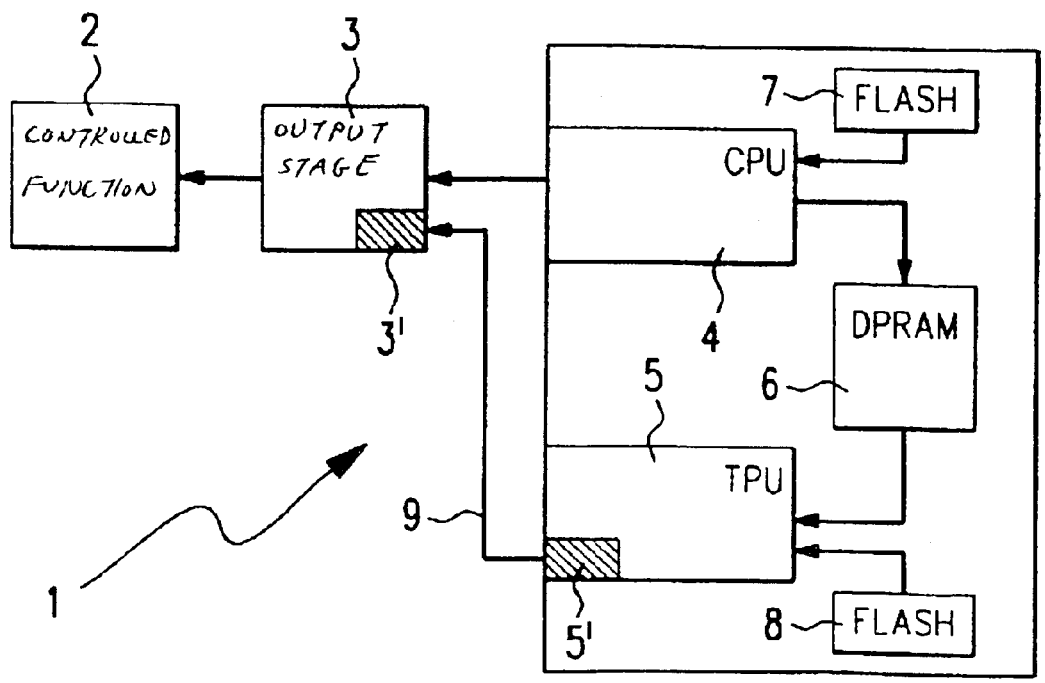
FIG. 2 is a schematic view of a control unit according to the present invention in a second embodiment.

FIGS. 1 and 2 illustrate a control unit according to the present invention in a first embodiment, designated as a whole by reference character 1. Control unit 1 is used to control and/or regulate various functions of the motor vehicle. The functions to be controlled/regulated include, e.g., pure comfort functions (e.g., climate control, electric windows, electric sunroof actuation, etc.), functions for operating the motor vehicle (e.g., internal combustion engine, transmission, power steering), safety-related functions (e.g., anti-lock braking (ABS), and dynamics of vehicular operation (electronic stability program, ESP), X-by-wire systems, etc.). The functions to be controlled/regulated are represented in FIG. 1 by a symbolic box designated with reference character 2. The motor vehicle function 2 to be controlled/regulated is activated via an output stage 3.

Control unit 1 includes a main computing element (Central Processing Unit, CPU) 4 having at least one microprocessor. In addition; control unit 1 includes an auxiliary computing element 5 that is for example formed as what is called a coprocessor (Time Processor Unit, TPU). Main computing element 4 and auxiliary computing element 5 may access a common memory element 6. The memory element is formed as a dual-port random-access memory (DPRAM). On a flash memory 7, a control/regulating program is stored that may be transferred, either as a whole or command-by-command, to main computing element 4 in order to be executed by this device. Control unit 1 may fulfill its normal control/regulation function through the running, in main computing element 4, of the control/regulation program stored on flash memory 7.

Moreover, stored in flash memory 7 is a part of a computer program for implementing the method according to the present invention that is executed on main computing element 4. Stored in a further flash memory 8 is a further part of the computer program for implementing the method according to the present invention that is executed on auxiliary computing element 5. As needed, the computer program may be transferred, either as a whole or command-by-command, from flash memory 7 into main computing element 4, or from flash memory 8 into auxiliary computing element 5, and may be run there for the realization of the inventive method. Main computing element 4, auxiliary computing element 5, memory element 6, and the two flash memories 7, 8 are configured on a shared semiconductor device (this is known as a single-chip system).

According to the present invention, a method is provided for monitoring the functioning of control device 1. In particular, auxiliary computing element 5 is used to monitor the functioning of main computing element 4. For this purpose, during the normal operation of control device 1, particular parts of the method according to the present invention are executed, in the form of a corresponding computer program, both in main computing element 4 and in auxiliary computing element 5. Of course, the method according to the present invention may also be realized in hardware.

Figure 3:
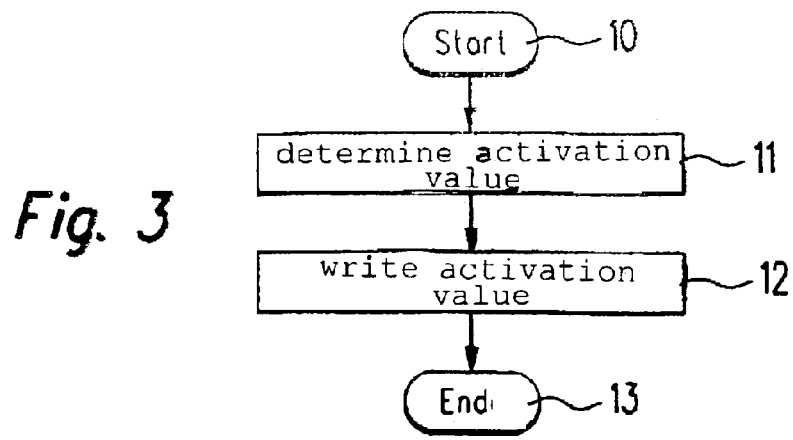
FIG. 3 is a flow-chart of a part of a method according to the present invention in an embodiment that runs on a main computing element of the control unit.

FIG. 3 illustrates a flow diagram of a portion of the method executed in main computing element 4. The partial method is called and executed either at regular chronological intervals or upon the occurrence of particular events. The partial method begins in a function block 10. In a function block 11, an activation value is determined that is to be stored in a specifiable memory location of memory element 6. The activation value may always be the same value, or else may be a value calculated according to a presettable algorithm. In a function block 12, the calculated activation value is stored in the predetermined memory location of memory element 6. In a function block 13, the partial method executed in main computing element 4 is terminated. From function block 13, the system again branches to the control/regulation program that is executed on main computing element 4 in the context of normal operation of control unit 1. The partial method illustrated in FIG. 3 may, for example, be called using interrupts. Thus, as long as main computing element 4 is in a state capable of functioning, the predetermined activation value is stored in the predetermined memory location in memory element 6. If main computing element 4 is faulty, either a false activation value is stored in the memory location, or else the correct activation value is stored, but not within a presettable time frame.

Figure 4:
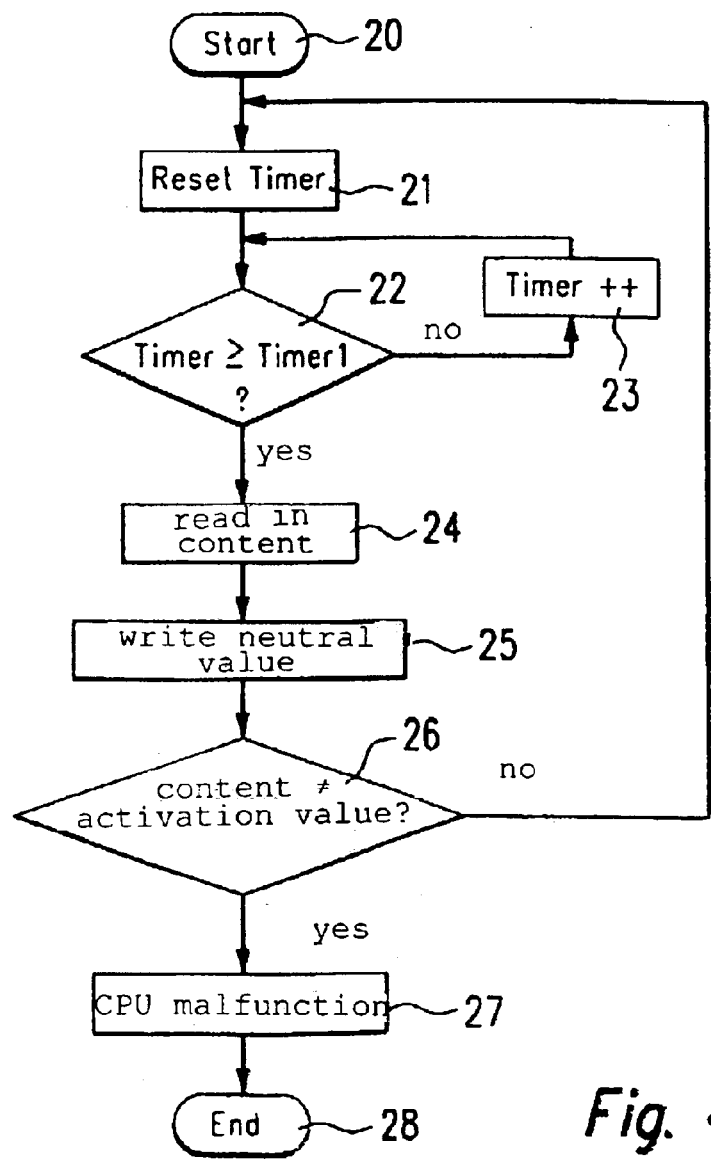
FIG. 4 is a flow-chart of a method according to the present invention in an embodiment that is executed on an auxiliary computing element of the control unit.

On auxiliary computing element 5, a computer program is executed for implementing a partial method, a flow diagram of which is illustrated in FIG. 4. The computer program begins in a function block 20. In a function block 21, a timing element (timer) of auxiliary computing element 5 is set. The timer is for example a register (fast memory) or a special circuit, a chip, or a software routine in auxiliary computing element 5 for measuring time intervals. The timer is not identical with the system clock of control device 1, although impulses of the timer may be derived from the clock frequency of the system clock.

In a query block 22, it is checked whether the timer is greater than or equal to a presettable timer value Timer1. Timer value Timer1 corresponds to the time duration during which main computing element 4 is allowed to store the activation value in the predetermined memory location of memory element 6. If this time duration has not yet elapsed, the timer is incremented upward in a function block 23. From function block 23, branching again takes place to query block 22. The query from query block 22 is repeated until the timer is greater than or equal to first timer value Timer1. Then, in a function block 24, the content of the predetermined memory location of memory unit 6 is read in. Subsequently, in a function block 25 a neutral value is written to the specified memory location.

Then, in a query block 26 it is checked whether the content of the memory location, read in at function block 24, is different from the activation value written by the CPU. If this is the case, this means that in the preceding cycle, main computing element 4 did not store the correct activation value, or did not store the activation value within the presettable time frame, in the memory location of memory element 6. In this case, in a function block 27 a malfunction of main computing element 4 is determined, and suitable countermeasures are introduced. These countermeasures maybe, for example, a resetting of the main control unit or the output stage 3 activated by control unit 1, for which the malfunction of main computing element 4 could become critical. The partial method is then terminated in a function block 28. The partial method illustrated in FIG. 4 may either be executed cyclically, or else it is called as needed, for example using an interrupt.

If query block 26 yields the result that the content of the memory location, read in at function block 24, is equal to the activation value, this means that main computing element 4 is operating without error. Branching takes place to function block 21, where the timer is again reset. The partial method illustrated in FIG. 4 will then be executed again. Alternatively, the partial method may also be terminated from query block 26, if the content of the memory location is equal to the activation value. In this case, branching would take place from query block 26 (Output NO) to function block 28.

In the exemplary embodiment illustrated in FIG. 1, an output signal of auxiliary computing element 5, applied to a pin 5', is switched over, for example from inactive to low. The output signal is routed to a reset pin 4' of main computing element 4 via a line 9. If an output signal is switched from inactive to low, main computing element 4 is reset (Reset).

In the exemplary embodiment illustrated in FIG. 2, pin 5' of auxiliary computing element 5 is connected with a reset pin 3' of output stage 3 via line 9. Reset pin 3' of output stage 3 is charged with the output signal. If the output signal switches for example from inactive to low, output stage 3 is reset (Reset).

If the resetting of main computing element 4, or of output stage 3, cannot remove the malfunction of main computing element 4, a complete switching off of main computing element 4 or of output stage 3 is also possible.

One advantage of the present invention is that, in contrast to known configurations, no separate monitoring unit is required. If control unit 1 has a plurality of auxiliary computing elements 5, a cascading of a plurality of auxiliary control units 5 is also possible in order to achieve a higher degree of reliability. The cascading of auxiliary computing elements 5 takes place, for example, using a wired OR connection.

What is claimed is:

1. A method for monitoring a functioning of a control unit for activating output stages in a motor vehicle, the control unit including a main computing element having at least one microprocessor, and at least one auxiliary computing element having at least one microprocessor, the main computing element and the at least one auxiliary computing element having access to a common memory element, comprising:

writing a preselected value as a content of a specified memory location of the common memory element by the main computing element;

performing a query of the content of the specified memory location of the common memory element, during operation of the control unit, by the at least one auxiliary computing element at preselected times; and the at least one auxiliary computing element determining that there is a malfunction of the main computing element if the specified memory location of the common memory element does not contain the pre-selected value or if the specified memory location of the common memory element does not contain the pre-selected value at the pre-selected time.

2. A method for monitoring a functioning of a control unit for activating output stages in a motor vehicle, the control unit including a main computing element having at least one microprocessor, and at least one auxiliary computing element having at least one microprocessor, the main computing element and the at least one auxiliary computing element having access to a memory element, comprising:

writing a preselected value as a content of a specified memory location of the memory element by the main computing element;

performing a query of the content of the specified memory location of the memory element, during operation of the control unit, by the at least one auxiliary computing element at preselected times; and writing the specified memory location of the memory element with a neutral value by the at least one auxiliary computing element, after the content of the specified memory location has been read.

3. The method according to claim 2, wherein the content of the specified memory location of the memory element is queried periodically by the at least one auxiliary computing element.

4. The method according to claim 2, further comprising:

outputting a preselected signal by the at least one auxiliary computing element if the content of the specified memory location of the memory element queried by the at least one auxiliary computing element is not equal to the preselected value.

5. The method according to claim 4, further comprising:

modifying a signal that is applied to at least one pin of the at least one auxiliary computing element; and applying the signal to at least one of an external reset pin of the main computing element and a reset pin of an output stage activated by the control unit when the content of the specified memory location of the memory element queried by the at least one auxiliary computing element is not equal to the preselected value.

6. The method according to claim 5, further comprising:

switching the signal applied to the at least one pin of the auxiliary computing element from inactive status to low status.

7. The method according to claim 2, wherein the main computing element is determined faulty if the at least one auxiliary computing element reads a value from the specified memory location of the memory element that is not equal to the preselected value.

8. The method according to claim 2, wherein the content of the specified memory location of the memory element is queried periodically by the at least one auxiliary computing element.

9. A computer-readable memory medium storing a set of instructions adapted to be executed by at least one of a main computing element of a control unit and at least one auxiliary computing element, to activate output stages in a motor vehicle, the set of instructions performing the steps of:

writing a preselected value as a content of a specified memory location of a common memory element by the main computing element;

performing a query of the content of the specified memory location of the common memory element, during operation of the control unit, by the at least one auxiliary computing element at preselected times; and the at least one auxiliary computing element determining that there is a malfunction of the main computing element if the specified memory location of the common memory element does not contain the pre-selected value or if the specified memory location of the common memory element does not contain the pre-selected value at the pre-selected time.

10. The memory medium according to claim 9, wherein the memory element is a flash memory.

11. A control unit for activating output stages in a motor vehicle, comprising:

a main computing element having at least one microprocessor;

at least one auxiliary computing element having at least one microprocessor; and a common memory element;

wherein the main computing element and the at least one auxiliary computing element communicate with one another via the common memory element, and wherein, during operation of the control unit, the at least one auxiliary computing element queries, at preselected times, a content of a specified memory location of the common memory element, the specified memory location having been previously written with a preselected value by the main computing element, and wherein the at least one auxiliary computing element determines that there is a malfunction of the main computing element if the specified memory location of the common memory element does not contain the pre-selected value or if the specified memory location of the common memory element does not contain the pre-selected value at the pre-selected time.

12. The control unit according to claim 11, wherein the memory element is a dual-port random-access memory.

13. The control unit according to claim 11, wherein the main computing element and the at least one auxiliary computing element are located on a common semiconductor device.

14. A control unit for activating output stages in a motor vehicle, comprising:

a main computing element having at least one microprocessor; and at least one auxiliary computing element having at least one microprocessor;

wherein the main computing element and the at least one auxiliary computing element communicate with one another via a memory element, and wherein, during operation of the control unit, the at least one auxiliary computing element queries, at preselected times, a content of a specified memory location of the memory element, the specified memory location having been previously written with a preselected value by the main computing element;

wherein the at least one auxiliary computing element writes the specified memory location of the memory element with a neutral value after the content of the specified memory location has been read by the at least one auxiliary computing element.

15. The control unit according to claim 14, wherein the memory element is a dual-port random-access memory.

16. The control unit according to claim 14, wherein the main computing element and the at least one auxiliary computing element are located on a common semiconductor device.

* * * * *